Patented Sept. 15, 1953

2,652,355

UNITED STATES PATENT OFFICE 2,652,355

FUNGICIDES

Nicholas Ercoli, Milan, Italy, and Gijsbertus van Wessem, Harrison, N. Y., assignors to Warner-Hudnut, Inc., a corporation of Delaware No Drawing. Application January 31, 1950, Serial No. 141,578

4 Claims. (Cl. 167—58)

This invention relates to new fungicidal agents eminently adapted for use against pathogenic organisms affecting the human body.

While thiocyanates and isothiocyanates have been widely used as insecticides, their use as fungicides is not common. Biochemical Journal, 40: 331–334 (1946) makes one of the few references to the fungicidal action of isothiocyanates, describing the fungicidal properties of certain aryl isothiocyanates, such as phenyl isothiocyanate, against organisms which are not pathogenic to man; moreover, the isothiocyanates disclosed are not suitable for use on the human body because of their obnoxious odor.

It is an object of this invention to provide new compositions of high fungicidal activity which are suitable for use on the human body.

We have discovered that thiocyanates having the general formula

Ar—O—AlkSCN in which Ar denotes a mono- or bi-nuclear aromatic hydrocarbon radical, which may bear one or more alkyl, aryl, cycloaliphatic, halogen, alkoxy or alkylmercapto substituents, and Alk denotes an alkylene radical containing not over 5 carbon atoms, are highly effective fungicidal and fungistatic agents in low concentrations. Furthermore, these compounds may be admixed with fungicide vehicles to provide compositions eminently suitable for application to the human body for control of pathogenic organisms thereon. The high fungicidal effectiveness of these compounds is well illustrated by the fact that preparations containing the above compounds in concentrations as low as 1% or less have been found to give excellent control of many of the pathogenic fungi affecting the body; by contrast, fungicidal agents such as the undecylenates, propionates or caprylates presently used for combatting such pathogenic fungi are generally employed in concentrations of about 25%. In addition, tests have established that our compositions possess the usual property of destroying not only the fungus organism but also the spores from which it is produced, thereby insuring permanent destruction of the fungus growth. Our compositions also possess a high degree of anti-bacterial action, destroying a variety of pathogenic micro-organisms. The value of our new compositions, therefore, is evident.

The fungicidal compositions of our invention may be prepared by mixing one or more of the compounds above described with suitable fungicide vehicles to form ointments, powders or other dosage forms in which fungicides may be utilized. The concentration of active ingredient in such compositions may vary considerably; for practical purposes, due to the high activity of the thiocyanates discovererd, the concentration need not exceed 10% by weight and may be as low as 0.01%; preferably, the concentration of active ingredient is between 0.05% and 3% by weight of the finished dosage form. In the preparation of ointments, the compounds above described may be blended with ointment bases to form products containing preferably from 0.05% to 3% by weight of the thiocyanate; if a non-greasy ointment is desired, a water-soluble, stainless base containing one or more of the polyethylene glycols may be employed, whereas if a greasy ointment is desired, a base such as petrolatum may be used. In preparing fungicidal powders in accordance with this invention, the thiocyanate may be admixed with powder bases such as zinc oxide, talc, cornstarch or a mixture thereof to form fungicidal powders preferably containing between 0.05% and 3% by weight of the active ingredient. Solutions or sprays for use in accordance with this invention may also be prepared by dissolving the thiocyanate in relatively low boiling solvents such as the lower alcohols or ketones or mixtures thereof, e. g. a mixture of isopropanol and acetone, to form solutions preferably containing between 0.05% and 3% by weight of the thiocyanate; in another embodiment solutions containing preferably from 0.05% to 3% of the thiocyanate in a highly volatile, normally gaseous solvent such as methylene chloride or the lower fluorinated hydrocarbons, may be formed for dispensation as aerosols.

Typical compositions prepared in accordance with our invention are listed below.

Ointment:

| | Per cent |
|---|---|
| γ - (p - Bromphenoxy) - propyl thiocyanate | 1 |
| Polyethylene glycol 300 | 79 |
| Carbowax 4000 | 20 |

Powder:

| | |
|---|---|
| γ - (p - Bromphenoxy) - propyl thiocyanate | 1 |
| Talc | 74 |
| Cornstarch | 5 |
| Boric acid | 5 |
| Colloidal kaolin | 5 |
| Zinc oxide | 10 |

Solution:

| | |
|---|---|
| γ - (p - Bromphenoxy) - propyl thiocyanate | 1 |
| Acetone | 5 |
| Isopropanol | 94 |

The compositions of our invention are particularly suitable for use in combatting pathogenic organisms affecting the human body, especially the ailment commonly known as athlete's foot. Since the thiocyanates above described are effective fungicides at extremely low concentrations, ointments, powders, solutions and the like may be prepared therefrom which are extremely bland and may be applied liberally to the skin with excellent tolerance. Another important feature of the compositions of this invention is that their fungicidal effectiveness remains relatively constant over a wide range of pH values, from as low as pH 1 to as high as pH 10. It is understood that while compositions of this invention are preeminently useful for topical application to human skin, their properties are such that they will also find utility for combatting plant fungi when applied as sprays or dusts.

The preferred embodiment of our invention is represented by the compositions above described, in which the active ingredient is the compound γ-(p-bromphenoxy)-propyl thiocyanate, since such compositions have been found to be exceedingly active while possessing optimum odor and lack of irritation such as to make them eminently adapted for application to the human body.

The compounds of our invention may be readily prepared by reacting a metallic thiocyanate with compounds having the general formula Ar—O—Alk—Hal in which Ar and Alk are as above defined and Hal denotes a halogen atom. These halides may be obtained by reaction of an alkylene dihalide with the corresponding phenol or its alkaline salt, or in any other suitable manner; thus, for example, the compound phenoxyethyl chloride may be prepared by the reaction of phenol with ethylene dichloride. Reaction of the halide and thiocyanate may be carried out under reflux, employing a suitable solvent such as ethanol; if desired, a catalyst such as copper powder may be used to accelerate the reaction.

It is to be understood that the term "thiocyanate" used in the specification and claims is intended to include not only thiocyanates, i. e. compounds containing the radical -SCN, but also isothiocyanates, i. e. compounds containing the radical -NCS, since the preparative methods employed may yield compounds of one or the other type, or mixtures thereof. Both the thiocyanates and isothiocyanates have been found to possess fungicidal activity.

As examples of compounds which may be prepared in accordance with this invention the following may be mentioned: γ-(p-bromphenoxy)-propyl thiocyanate; phenoxyethyl thiocyanate; γ-phenoxypropyl thiocyanate; Δ-phenoxybutyl thiocyanate; o-toloxy-ethyl thiocyanate; p-bromphenoxyethyl thiocyanate; o-chlorphenoxyethyl thiocyanate; γ-(m-chlorphenoxy)-propyl thiocyanate; p-methoxyphenoxyethyl thiocyanate; p-phenylphenoxypropyl thiocyanate; cyclohexylphenoxypropyl thiocyanate; o-methylmercaptophenoxyethyl thiocyanate; and naphthoxyethyl thiocyanate.

The following table sets forth the high fungicidal activity possessed by typical compounds of our invention. Fungicidal activity was determined by cutting agar plates carrying 9 to 11 days old cultures into discs 1 cm. in diameter and transferring these discs into 10 cc. of the fungicide solution dissolved in 95% ethanol. After one minute immersion in such solution, the discs were transferred to 10 cc. of sterile nutrient broth and shaken lightly for three minutes to free the culture of water-soluble or water-miscible material. The disc was removed from the broth and washed with 10 cc. of 30% aqueous acetone for five minutes to remove the fungicide, then with sterile nutrient broth for two minutes and placed culture side down over the surface of an agar plate and incubated at 25° C. for 21 days, while periodically checking for fungus growth. The fungus organisms employed in the tests were one of the following pathogenic organisms: Tricophyton mentagrophytes, Epidermophyton floccosum, Epidermophyton rubrum, Cryptococcus neoformans, and Microsporum felineum. The values given in the table set forth below represent percent concentration of active ingredient in the solution which inhibits growth; the lower the value given, the more active is the compound.

Table I

| Compound Tested | Active Concentration |
|---|---|
| γ-(p-bromphenoxy)-propyl thiocyanate | 0.1 |
| γ-(p-chlorphenoxy)-propyl thiocyanate | 1.0 |
| γ-(m-chlorphenoxy)-propyl thiocyanate | 0.1 |
| γ-(o-chlorphenoxy)-propyl thiocyanate | 0.1 |
| p-bromphenoxyethyl thiocyanate | 1.0 |
| o-chlorphenoxyethyl thiocyanate | 1.0 |
| m-chlorphenoxyethyl thiocyanate | 1.0 |
| p-chlorphenoxyethyl thiocyanate | 0.1 |
| o-toloxyethyl thiocyanate | 1.0 |
| p-toloxyethyl thiocyanate | 1.0 |
| phenoxyethyl thiocyanate | 0.2 |
| γ-phenoxypropyl thiocyanate | 2.0 |
| Δ-phenoxybutyl thiocyanate | 1.0 |

Further tests have shown the compounds of our invention to possess a high degree of bactericidal activity toward bacteria such as Staph. aureus, E. coli and M. tuberculosis avirulent. These compounds also effectively destroy fungal spores, such as the spores of Aspergillus fumigatus, Tricophyton mentagrophytes and Epidermophyton rubrum in concentrations of the order of 1 part in 20,000 to 50,000.

The following examples are illustrative of our invention:

Example 1

185 g. of p-bromphenol, 516 g. of trimethylene dibromide and 100 cc. of water were introduced into a vessel and 75 g. of sodium hydroxide in 250 cc. water were then gradually added over a period of one hour with agitation. The mixture was refluxed for 6 hours, permitted to cool and the upper aqueous layer withdrawn and discarded. The lower organic layer was then fractionally distilled under vacuum, a product boiling between 120° and 130° C. at 1.0 mm. pressure being recovered.

29.4 g. of the product prepared as above described, 10.7 g. of potassium thiocyanate and 150 cc. of absolute ethanol were refluxed for 10 hours. The precipitated potassium bromide was removed by filtration, the filtrate concentrated under vacuum, chilled, and the product filtered and dried. The product thus obtained had a melting point in the range of 48° to 52° C. and was identified as the desired γ-(p-bromphenoxy)-propyl thiocyanate.

Example 2

367 g. of p-bromphenol, 94 g. of sodium hydroxide and 500 cc. of water were introduced into a vessel and 500 g. of ethylene bromide were gradually added; the mixture was then refluxed for 6½ hours. The upper aqueous layer was separated and discarded, and the lower organic layer, which had largely solidified, was filtered. The solid material was recrystallized from ethanol, whereby a product melting at 57°–57.5° C. was obtained, which, upon analysis, was found to be the desired p-bromphenoxyethyl bromide.

28 g. of the product obtained as above described, 10.7 g. of potassium thiocyanate and 225 cc. of absolute ethanol were refluxed for 10 hours. The mixture was permitted to cool to about 50° C., filtered to remove potassium bromide, and the filtrate was evaporated under vacuum to a small volume. This concentrated filtrate was refrigerated for several hours, whereby a voluminous crystalline precipitate was obtained. After recrystallization from methanol, a product melting at 62–63° C. was obtained. Analysis established this product to be the desired β-(p-bromphenoxy)-ethyl thiocyanate.

*Example 3*

50 g. of phenoxyethyl bromide, 27 g. of potassium thiocyanate and 50 cc. of absolute ethanol were refluxed for 6 hours, and the reaction mixture permitted to stand overnight at room temperature. 340 cc. of ether were then added and the precipitated potassium bromide removed by filtration. The filtrate was fractionally distilled under reduced pressure to give the desired β-phenoxyethyl thiocyanate, boiling point 111°–112° C. at 0.3 mm.

*Example 4*

108 g. of o-cresol, 226 g. of ethylene dibromide and 140 cc. of water were placed in a vessel and heated to the boiling point, and a solution of 44 g. sodium hydroxide in 100 cc. water was then gradually added. The reaction mixture was then refluxed with stirring for 8 hours. The lower organic layer was separated and fractionally distilled under vacuum to yield the desired β-(o-toloxy)-ethyl bromide, boiling point 95°–100° C. at 4–5 mm.

82.2 g. of the above described product, 25.9 g. potassium thiocyanate and 52 cc. of absolute ethanol were refluxed for 4 hours and then allowed to cool to room temperature. The cooled mixture was diluted with 5 volumes of ether and then allowed to stand overnight in the refrigerator. The precipitated potassium bromide was removed by filtration and the filtrate, after evaporation of the solvent, was fractionally distilled under vacuum to give the desired β-(o-toloxyethyl)-thiocyanate, boiling point 119° C. at 0.2 mm.

Since certain changes may be made in the above compositions and in the methods for preparing them without departing from the scope of the invention, it is intended that all matter contained in the above description shall be interpreted as illustrative and not in a limiting sense.

We claim:
1. A fungicidal composition comprising, as an essential active ingredient γ-(p-bromphenoxy)-propyl thiocyanate and a carrier therefor, the proportion of the active essential ingredient being within the range of about 0.05 to about 3.00 percent by weight of the combined weight of said ingredient and said carrier, said composition being adapted for application to the human skin for control of pathogenic organisms thereon.

2. A fungicidal ointment composition comprising, as an essential active ingredient γ-(p-bromphenoxy)-propyl thiocyanate and an ointment carrier therefor, the proportion of the active essential ingredient being within the range of about 0.05 to about 3.00 percent by weight of the combined weight of said ingredient and said carrier, said composition being adapted for application to the human skin for control of pathogenic organisms thereon.

3. A fungicidal dusting composition comprising, as an essential active ingredient γ-(p-bromphenoxy)-propyl thiocyanate and a powder carrier therefor, the proportion of the active essential ingredient being within the range of about 0.05 to about 3.00 percent by weight of the combined weight of said ingredient and said carrier, said composition being adapted for application to the human skin for control of pathogenic organisms thereon.

4. A fungicidal liquid composition comprising, as an essential active ingredient γ-(p-bromphenoxy)-propyl thiocyanate and a relatively low boiling organic solvent liquid carrier therefor, the proportion of the active essential ingredient being within the range of about 0.05 to about 3.00 percent by weight of the combined weight of said ingredient and said carrier, said composition being adapted for application to the human skin for control of pathogenic organisms thereon.

NICHOLAS ERCOLI.
GIJSBERTUS VAN WESSEM.

References Cited in the file of this patent

Zscharn, Fortschritte der Therapie, volume 18, pages 202 to 206, 1942.

Journal American Pharmaceutical Association, Prac. Pharm. Edition, July 1948, page 446.

Wilcoxon, Contributions From Boyce Thompson Institute, volume 7 (1935) 31, 333–9.

Schwartz, New York State Jour. Med., August 15, 1947, pages 1782–3.

Oster et al., American Journal of Pharmacy, October 1949, pages 375 to 389.

Scobbie, Brit. Med. J., March 24, 1945, pages 409, 410.

Kast, Chemical Abstracts, volume 41, page 6674 (1947).

Weidner, Ibid., volume 41, page 6676 (1947).

Kantor, Ibid., volume 36, page 6569 (1942).

Wagner, Ibid., volume 36, page 6661–2 (1942).

Zcharn, Ibid., volume 37, page 3504 (1943).